UNITED STATES PATENT OFFICE.

JAMES KENT GRIFFIN, OF WATERDOWN, CANADA.

IMPROVEMENT IN COMPOSITIONS FOR PAVEMENTS, BLOCKS FOR BUILDINGS, &c.

Specification forming part of Letters Patent No. 132,153, dated October 15, 1872.

*To all whom it may concern:*

Be it known that I, JAMES KENT GRIFFIN, of Waterdown, Wentworth county, Province of Ontario, in the Dominion of Canada, have invented a new and useful Improved Composition for Pavements, Blocks for Buildings, Forts, &c., of which the following is a specification:

This invention has for its object to produce a compound for forming pavements, blocks for buildings, forts, &c. My invention consists in impregnating and coating sawdust or disintegrated wood fiber with asphalt or tar, and binding the same together with a cement.

In carrying out my invention I first treat the sawdust or disintegrated wood fiber with a liquid solution of asphalt, tar, or pitch, applying sufficient of the liquid solution to thoroughly impregnate and coat all particles of the said sawdust or disintegrated wood fiber, binding the same thus treated with a cement, so as to form a thick paste or plastic mass.

The proportions will be about as follows: Sawdust or disintegrated wood fiber treated with asphalt, forty parts; sand, gravel, or broken stone, forty parts; coal ashes, ten parts; hydraulic cement, ten parts. Instead of treating the sawdust or disintegrated wood fiber with asphalt, tar, or pitch, as above described, I will treat the same with silicate of potash or soda, and use it with the other ingredients named above. By impregnating or coating the sawdust or the disintegrated wood fiber with asphalt, pitch, or tar, and incorporating with the same a cement, the same is preserved and the whole rendered light, compact, and enduring, less liable to be affected by heat or frost, and when employed for pavements will be found free from dust and more agreeable to ride upon than roads of cement, gravel, or wood. In laying pavements the usual bed will be prepared and subjected to rolling or pressure, when the composition above described will be applied directly upon the bed and it subjected to tamping or pressure by rollers.

For forts or buildings the composition will be formed into blocks in molds and subjected to pressure.

Pavements formed of this composition will be ready for gravel almost as soon as laid, as the ingredients employed will cause the composition to "set" or indurate almost immediately. Blocks for buildings, forts, &c., will be ready for immediate use, requiring no exposure to heat, as in baking.

The whole when properly made will be fire-proof and impervious to the action of water.

Having thus described my invention, what I claim as new, and desire to secure by Letters Patent, is—

A composition composed of sawdust or disintegrated wood fiber, treated with silicate of soda or potash and combined with asphalt or tar and a hydraulic cement compounded in the manner and about in the proportions specified, for the purpose specified.

In testimony that I claim the foregoing I have signed my name this 23d day of February, A. D. 1872.

JAMES K. GRIFFIN.

Witnesses:
　JAMES L. NORRIS,
　W. J. PEYTON.